March 2, 1937. J. E. G. EURICH 2,072,164
SPECIFIC GRAVITY INDICATING DEVICE

Filed April 24, 1935

INVENTOR
Joe E. G. Eurich
BY
ATTORNEY

Patented Mar. 2, 1937

2,072,164

UNITED STATES PATENT OFFICE 2,072,164

SPECIFIC GRAVITY INDICATING DEVICE

Joe Emil George Eurich, West Didsbury, Manchester, England, assignor to U S L Battery Corporation, Niagara Falls, N. Y., a corporation of New York Application April 24, 1935, Serial No. 18,064
In Great Britain April 24, 1934

6 Claims. (Cl. 265—45)

This invention relates to a specific gravity indicating device for use more particularly in connection with electrical storage batteries where the case or container is composed of a transparent material, such as glass, celluloid and the like, the device being adapted to be immersed in the electrolyte or liquid therein so as to indicate either the relative density thereof or the state of charge, or both.

According to this invention the improved device is in the form of a unit comprising a calibrated scale having an arm or pointer pivotally supported thereby, the said arm or pointer being of a predetermined specific gravity and having associated therewith a chamber adapted to contain a predetermined quantity or volume of air or other fluid.

In order that the said invention may be clearly understood and readily carried into effect, the same will now be described more fully, by way of example, with reference to the accompanying drawing, in which.

Figure 1:
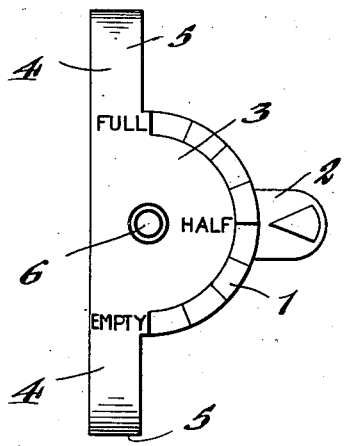
Figure 1 is a front view of a device embodying the invention.
Figure 2:
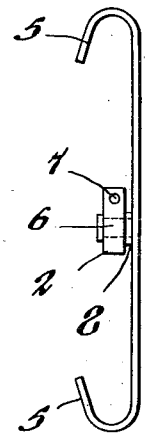
Figure 2 is a view taken at right angles to Figure 1.
Figure 3:
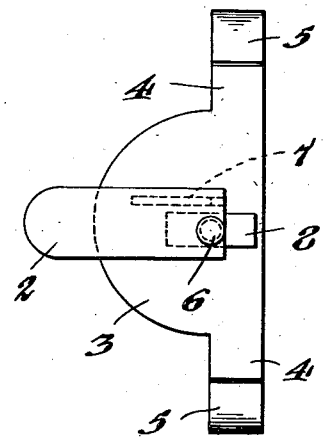
Figure 3 is a rear view of the device.

Referring to the drawing, 1 denotes the calibrated scale and 2 the member constituting the arm or pointer. The scale comprises a plate 3 which may be made of any suitable material of an insulating acid-resisting character such, for example, as bakelite, ebonite, celluloid or the like. The said plate is formed so as to afford a scale preferably of semi-circular shape and calibrated to give readings over an arc of 180° or less. The plate is also shown provided with extensions 4 which are bent at their outer extremities 5 to permit the device to be located yieldably in position within the transparent case or container of an electrical accumulator or cell, for example, between one of the walls thereof and the plates or active elements. If desired, a recess may be moulded within the case or container to receive the device and prevent movement thereof when located in position. However, any appropriate means may be adopted to retain the device in position.

The arm or pointer 2, which may be of any desired shape, may be made of any suitable material, such as that above described with reference to the scale plate 3, the material being of a higher specific gravity than that of water. The pointer in the present example, is shown in the form of an elongated arm or member pivotally connected to the scale as at 6, the point of pivotal connnection being situated at a predetermined distance below the center of gravity of the pointer, assuming the length of the pointer to be in a horizontal position. A predetermined quantity or volume of air or other fluid is contained in a chamber 7 associated with the pointer, the said chamber being disposed above the center of gravity of the pointer, assuming the length of the pointer to be in a horizontal position. The preferred method of making the pointer with the said chamber is to mould it in one piece with a cavity which is then sealed with bitumen, ebonite, celluloid, or the like to prevent the entrance of the liquid in which the pointer may be immersed. The arm or pointer is preferably engraved, marked, or provided with an arrow or arrowhead pointing in the direction of its axis, as in the example shown, and is so arranged that when looking at the scale only part of the pointer is visible. A distance piece 8 is provided between the pivoted pointer and the rear face of the scale plate.

In the use of the device, the density of a liquid is indicated to be low when the pointer points in a downward direction, and increase in the liquid density influences the pointer to rise about its axis until it points in an upward and vertical direction when a maximum density is reached.

Having now particularly described and ascertained the nature of my said invention and in what manner the same is to be performed, I declare that what I claim is:—

1. A specific gravity indicating device adapted to be immersed in a battery electrolyte, comprising a scale, and an elongate displacement member pivotallly supported at one end by said scale, said member being symmetrical with respect to the longitudinal axis thereof and having a chamber formed therein eccentric to and above said longitudinal axis adapted to receive a fluid of a specific gravity different from that of said member, whereby variations in the specific gravity of said electrolyte will cause said member to assume positions of equilibrium intermediate of two extreme positions.

2. A specific gravity indicating device adapted to be immersed in a battery electrolyte, comprising a scale, and an elongate displacement member symmetrical with respect to the longitudinal axis thereof, said member being pivotally supported at one end by said scale at a point below said longitudinal axis and having a sealed chamber therein above said longitudinal axis.

3. A specific gravity indicator adapted to be immersed in the electrolyte of a storage battery, comprising a supporting member having a calibrated portion, an indicator arm pivotally mounted at one end on said supporting member and adapted at its free end to cooperate with said scale to indicate the specific gravity of the electrolyte, said indicator arm being provided with a recess extending above the longitudinal axis thereof and adapted to receive a fluid of different specific gravity from that of said indicating arm, whereby the effective net weight of said arm may be varied.

4. A combined indicator arm and float adapted to be immersed in the electrolyte of a storage battery, comprising a member adapted to be pivotally mounted at one end to a support and adapted at its free end to cooperate with a scale to indicate the specific gravity of the electrolyte, said member having a recess positioned above the longitudinal axis thereof adapted to receive fluid of different specific gravity from that of said arm, whereby adjustments may be made in the effective weight of said indicator arm.

5. A specific gravity indicating device in the form of a unit comprising a calibrated scale having an arm or pointer pivotally supported thereby, the said arm or pointer being of a predetermined specific gravity, and having resilient supporting members integral with said scale adapted to be compressed between the container and the plate of a storage battery.

6. A specific gravity indicating device in the form of a unit comprising a calibrated scale having an arm or pointer pivotally supported thereby, the said arm or pointer being of a predetermined specific gravity, and the said scale having integrally aligned projections bent back on themselves at their free ends adapted to frictionally engage the container and the element of a storage battery.

JOE EMIL GEORGE EURICH.